(12) United States Patent
Lee et al.

(10) Patent No.: US 6,742,056 B2
(45) Date of Patent: May 25, 2004

(54) SEMICONDUCTOR DEVICE AND METHOD FOR INITIALIZING INTERFACE CARD USING SERIAL EEPROM (75) Inventors: Cheon-su Lee, Yongin (KR); Young-sik Kim, Seoul (KR); Soon-jae Won, Yongin (KR)

(73) Assignee: Samsung Electronics Co., Ltd. (KR)

( * ) Notice: Subject to any disclaimer, the term of this patent is extended or adjusted under 35 U.S.C. 154(b) by 64 days.

(21) Appl. No.: 10/265,860

(22) Filed: Oct. 7, 2002

(65) Prior Publication Data

US 2003/0074495 A1 Apr. 17, 2003

(30) Foreign Application Priority Data

Oct. 16, 2001 (KR) ........................................ 2001-63766

(51) Int. Cl.[7] ................................................. G06F 3/00
(52) U.S. Cl. ............................ 710/10; 710/22; 710/301
(58) Field of Search ............................... 710/8, 10, 301, 710/302, 22, 23, 25, 28; 713/1, 2

(56) References Cited

U.S. PATENT DOCUMENTS

| | | | | |
|---|---|---|---|---|
| 5,737,524 A | * | 4/1998 | Cohen et al. | 710/301 |
| 6,029,211 A | * | 2/2000 | Nakashima | 710/14 |
| 6,189,063 B1 | * | 2/2001 | Rekeita et al. | 710/311 |
| 6,256,692 B1 | * | 7/2001 | Yoda et al. | 710/104 |
| 6,393,558 B1 | * | 5/2002 | Kim | 713/1 |
| 6,397,268 B1 | * | 5/2002 | Cepulis | 710/8 |
| 6,611,912 B1 | * | 8/2003 | Maleck et al. | 713/100 |
| 2003/0074495 A1 | * | 4/2003 | Lee et al. | 710/10 |

* cited by examiner

Primary Examiner—Fritz Fleming
(74) Attorney, Agent, or Firm—Mills & Onello LLP (57) ABSTRACT A semiconductor device for initializing an interface card using a serial EEPROM and an initializing method allow for more effective use of a serial EEPROM used to store the initialization information, while not consuming additional circuit surface area. The method comprises initializing a semiconductor device, wherein the semiconductor device stores initialization information in a serial electrically erasable and programmable read only memory (EEPROM) and includes a direct memory access (DMA), a serial EEPROM interface, and a register interface that are connected to a common system bus according to the initialization information, the method comprising (a) setting an operational channel to allow the DMA automatically initialize the semiconductor device in a state where the semiconductor device is reset; (b) reading the initialization information from the serial EEPROM in response to the operational channel set in the DMA after the reset state of the semiconductor device is cancelled; (c) initializing the semiconductor device by writing the initialization information read out from the serial EEPROM to the register interface; (d) generating an initialization completion signal for indicating that the initialization of the semiconductor device is completed, and (e) automatically setting the register interface and the DMA to be prepared for normal operations after the initialization of the semiconductor device is completed.

31 Claims, 9 Drawing Sheets

SEMICONDUCTOR DEVICE AND METHOD FOR INITIALIZING INTERFACE CARD USING SERIAL EEPROM

BACKGROUND OF THE INVENTION

1. Field of the Invention

The present invention relates to a semiconductor device, and more particularly, to a semiconductor device and a method for initializing an interface card using a serial electrically erasable and programmable read only memory (EEPROM).

2. Description of the Related Art

In current semiconductor systems, it is common for a PCI bus or cardbus PC card to be used as an interface between circuits In general, the PCI bus is used as an interface to transmit data at high speeds, whereas the cardbus PC card is an interface that adopts a PCI bus structure due to restrictions on the transmission bandwidth of a conventional personal computer memory card international association (PCMCIA) card.

Most PCI cards or cardbus PC cards simply process data using only a digital signal processor without a central processing unit (CPU). Since there is a need for data to be processed at higher speeds and managed more effectively, system-on-a-chip (SOC)-type systems that include CPUs have been developed.

In the case of a PCI system, a plurality of PCI cards are connected to a PCI bus. A HOST/PCI bridge is installed between the CPU of a host system and the PCI bus, and a plurality of PCI cards may be connected to the PCI bus. A cardbus PC card system may have a connection structure similar to that of the PCI system.

An SOC-type PCI interface chip including a CPU may be used in a PCI card. In the PCI card, a configuration register of a PCI interface unit must be initialized to a predetermined state. A configuration register of the PCI card must also be initialized to a predetermined state.

Figure 1:
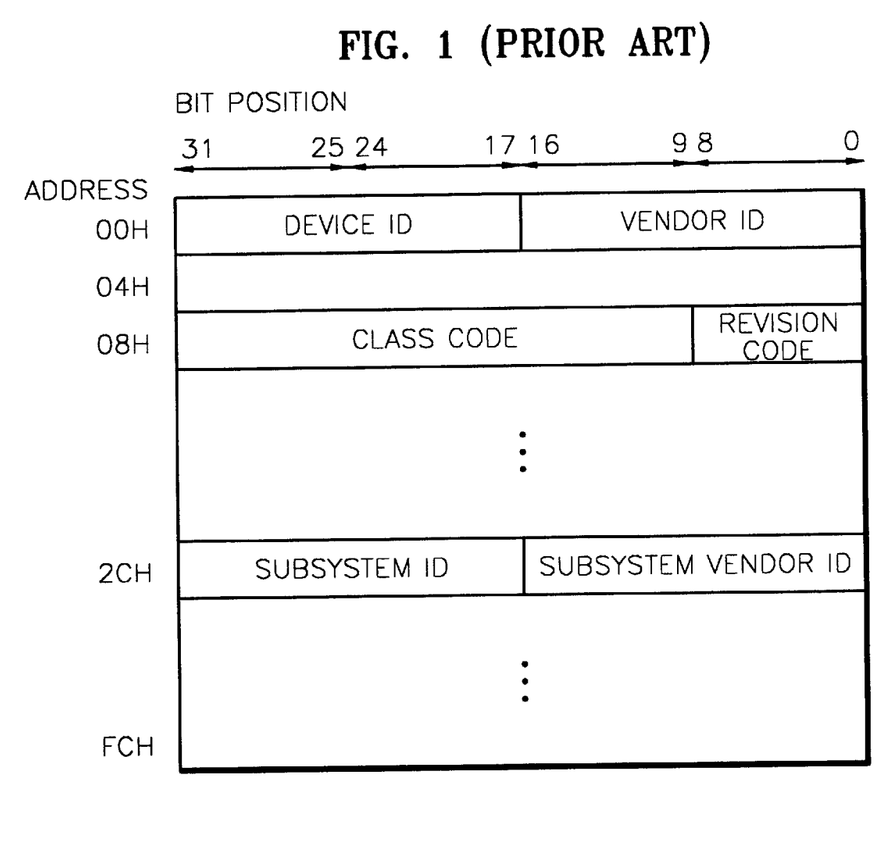
FIG. 1 is a register map illustrating the structure of a configuration register of a PCI card.

FIG. 1 is a register map showing the structure of a configuration register of a PCI card. Referring to FIG. 1, the bit positions of registers are marked along the X-axis, and the register addresses are expressed as hexadecimal numbers along the Y-axis. Registers for classifying PCI cards are shown in FIG. 1. Specifically, device identification (ID), vendor ID, class code, revision code, subsystem ID, and subsystem vendor ID are data required in order to classify and identify PCI cards in a host CPU of a personal computer system or in order to perform a plug-and-play operation. The vendor ID is used for an interface number that is used to identify the manufacturer of an interface system on chip mounted on a PCI card, and the device ID is used for an ID number of a chip given by the manufacturer, the class code is used to identify the type of chip mounted on a PCI card, and the revision code identifies the version of a chip. The subsystem vendor ID identifies the manufacturer of a PCI card, on which a chip will be mounted, and the subsystem ID contains the ID number of a PCI card given by the manufacturer. The device ID and the vendor ID are data specific to a PCI interface chip and are set by the manufacture of the chip. However, since there are various PCI cards manufactured by different manufacturers, on which chips will be mounted, it is impossible for the chip manufacturers to fix the class code, revision code, subsystem Id, and subsystem vendor ID of a PCI card without using an external memory. A cardbus PC card includes a configuration register having substantially the same structure as that of a configuration register of a PCI card.

Hereinafter, the class code, revision code, subsystem ID, and subsystem vendor of a PCI card are referred to as the initial data of a PCI card.

Card information structure (CIS) information in a cardbus PC card system displays predetermined data concerning a cardbus PC card, which are fixed data and thus cannot be changed during operation of the cardbus PC card.

A central processing unit (CPU) host reads data stored in one of the registers shown in FIG. 1 in order to read CIS information stored in a cardbus PC card. The CPU host than analyzes the data and identifies the part of the register in which the CIS information is located. Next, the host CPU reads the CIS information from the register and allows the cardbus PC card to operate. However, in the case when the CIS information is not located at a desired position, it is impossible to determine which kind of card is connected to a cardbus and allow the card to appropriately operate. Accordingly, it becomes necessary to move the CIS information from an original location where the CIS information is originally stored, to another location where the time taken to access the CIS information can be reduced.

Figure 2:
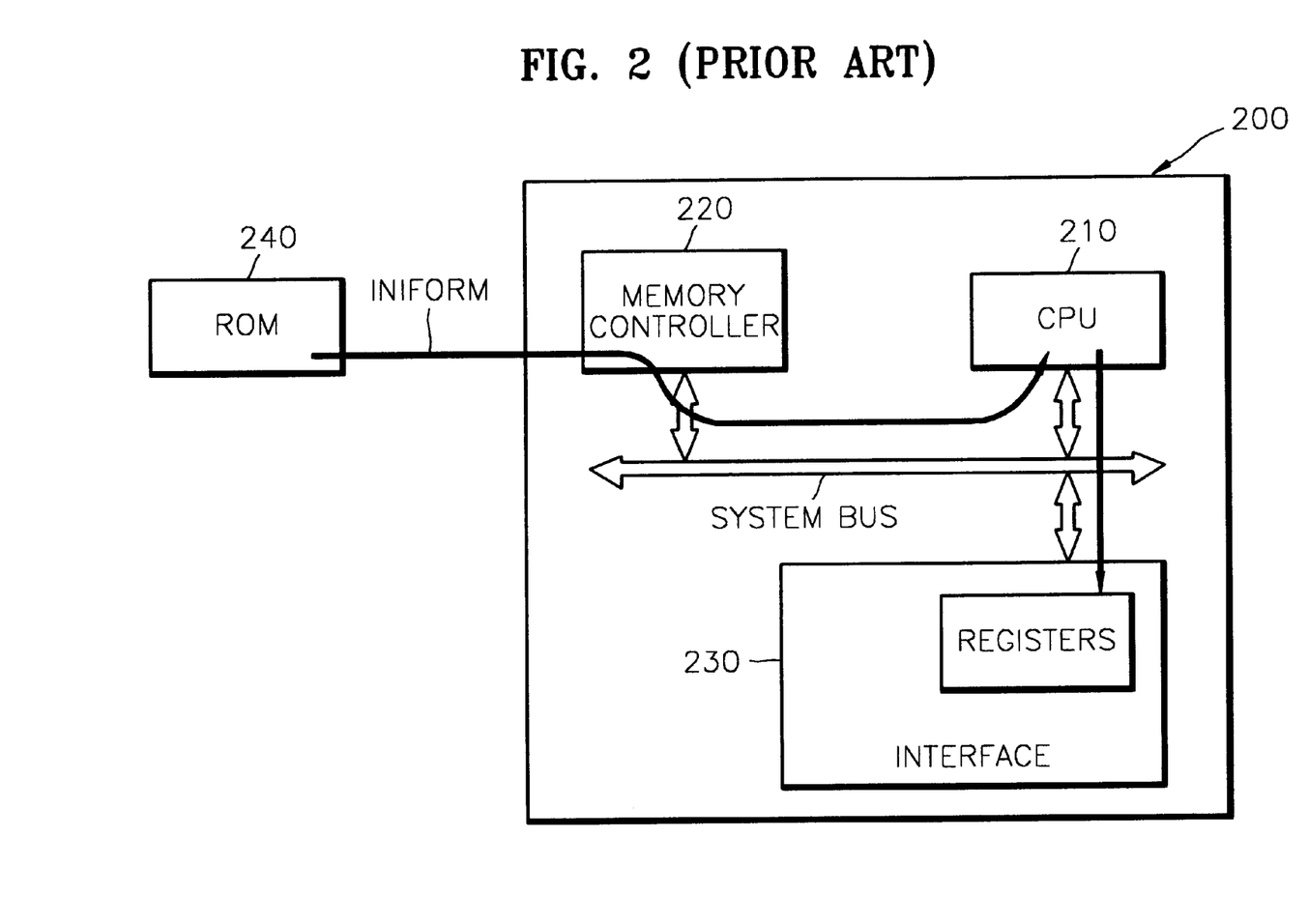
FIG. 2 is a block diagram of a first conventional semiconductor device for initializing a PCI card or a cardbus PC card.

FIG. 2 is a block diagram of a conventional semiconductor device for initializing a PCI card or a cardbus PC card. Referring to FIG. 2, a conventional semiconductor device 200 is a chip 200 installed in a PCI card or a cardbus PC card. The chip 200 includes a CPU 210 connected to a system bus, a memory controller 220, and an interface 230.

In the conventional systems, in order to initialize a PCI card, the CPU 210 reads initialization information INIFORM from an external read only memory (ROM) 240 using the memory controller 220 after the reset operation of the PCI card is completed, and stores the initialization information in a predetermined register of the interface 230, thus initializing the interface 230. The initialization information is stored in the ROM 240 as data or as a program. Since the ROM 240 is necessary for initializing the PCI card, it is difficult to modify a program concerning the initialization information stored in the ROM 240.

In the case of a cardbus PC card, like the PCI card described above, the CPU 210 reads the initialization information from the ROM 240 using the memory controller 220 after the reset operation of the cardbus PC card is completed and stores the initialization information in a predetermined register of an interface 230, thus initializing the interface 230. Since the ROM 240 is necessary for initializing the cardbus PC card, like the PCI card, it is also difficult to modify a program that includes the initialization information stored in the ROM 240. In addition, CIS information must also be stored in the cardbus PC card, unlike the PCI card.

Figure 3:
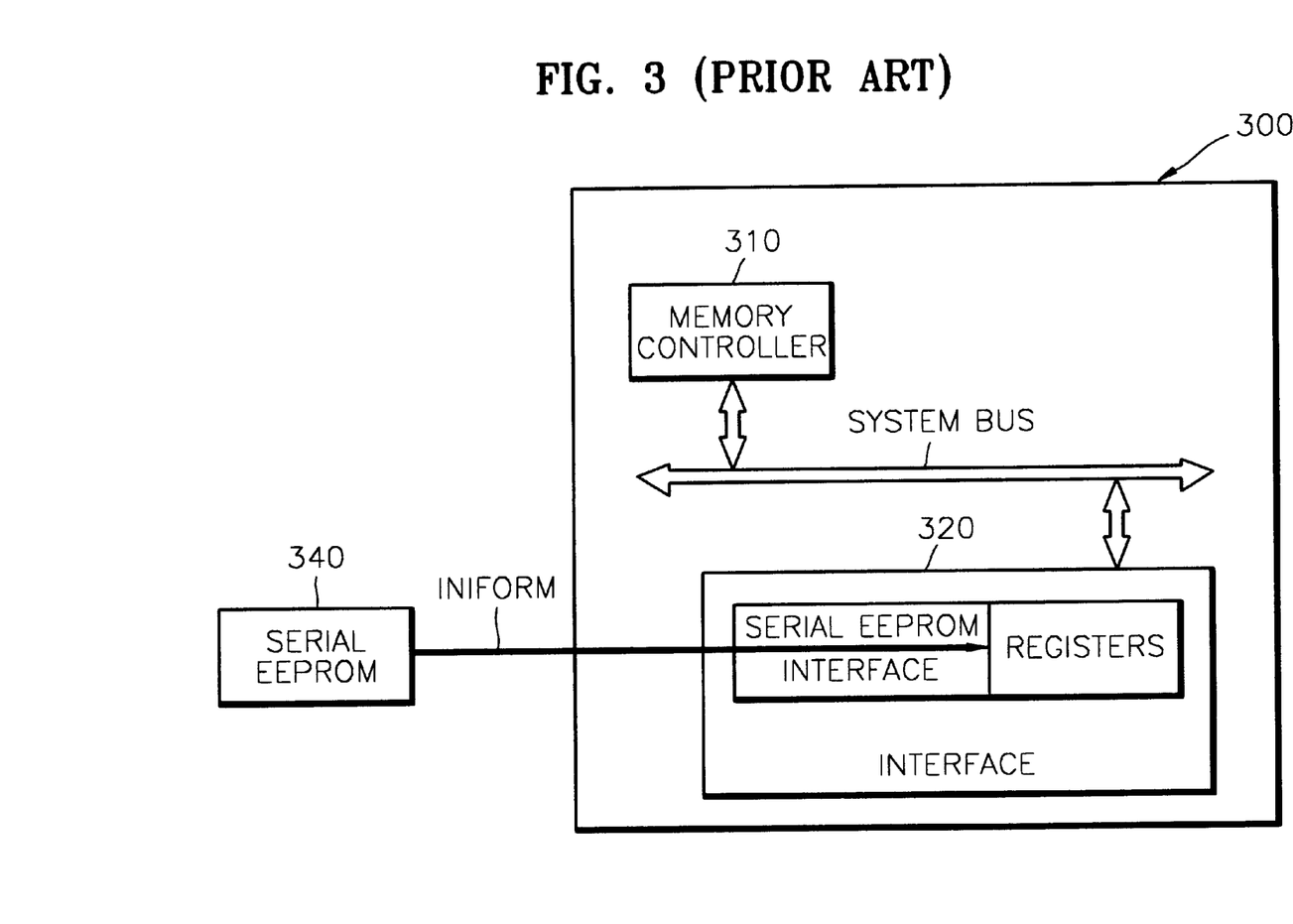
FIG. 3 is a block diagram of a second conventional semiconductor device for initializing a PCI card or a cardbus PC card.

FIG. 3 is a block diagram of a conventional semiconductor device for initializing a PCI card or a cardbus PC card. Referring to FIG. 3, a conventional semiconductor device 300 is a chip 300 installed in a PCI card or a cardbus PC card. The chip 300 includes a memory controller 310 connected to a bus system and an interface 320. The interface 320 includes a serial electrically erasable and programmable read only memory (EEPROM) interface 330.

The semiconductor device 300 shown in FIG. 3, unlike the semiconductor device 200 shown in FIG. 2, uses only a serial EEPROM 340, in which only the initialization information necessary to initialize the interface 320 is stored, instead of the external ROM 240 shown in FIG. 2. In other words, after the reset operation of a PCI card or a cardbus PC card is completed, the serial EEPROM interface 330 in the interface 320 automatically reads initialization information INIFORM of the serial EEPROM 340 and stores the initialization information in a predetermined register, thus initializing the interface 320. In this manner, it is not necessary for the CPU to be in the chip 300 in a PCI card or a cardbus PC card, since a device driver of a host system downloads a program for operating the PCI card or the cardbus PC card from a volatile memory (not shown), such as a SRAM, which is located outside the chip 300, via a bus system installed in the chip 300, thus operating the PCI card or the cardbus PC card.

In the case of operating the PCI card or the cardbus PC card using a downloaded program, the initialization information of the PCI card or the cardbus PC card is stored in the serial EEPROM 340 and is automatically read by the serial EEPROM interface 330 in the interface 320 after resetting the PCI card or the cardbus PC card.

In the above-described method, the PCI card or the cardbus PC card is generally initialized using the serial EEPROM interface 330 installed in the interface 320 instead of using a serial EEPROM interface (not shown) separately connected to a bus system. However, in this method, a circuit, which serves as the serial EEPROM interface (not shown) separately connected to a bus system, is necessary, and thus the area of the interface 320 needs to be increased. In addition, a pin used to allow the interface 320 to interface with the serial EEPROM 340 is additionally required, and it is difficult to effectively use the serial EEPROM 340 for purposes other than for storing initialization information.

SUMMARY OF THE INVENTION

To address the above-described limitations, it is an object of the present invention to provide a method of initializing a semiconductor device for initializing an interface card without increasing the area of a circuit.

It is a second object of the present invention to provide a semiconductor device for initializing an interface card without increasing the area of a circuit.

To achieve the first object according to the first embodiment of the present invention, there is provided a method of initializing a semiconductor device, wherein the semiconductor device stores initialization information in a serial electrically erasable and programmable read only memory (EEPROM) and includes a direct memory access (DMA), a serial EEPROM interface, and a register interface that are connected to a bus system bus according to the initialization information, the method comprising the acts of: (a) setting an operational channel to allow the DMA automatically initialize the semiconductor device in a state where the semiconductor device is reset; (b) reading the initialization information from the serial EEPROM following the operational channel set in the DMA after the reset state of the semiconductor device is cancelled; (c) initializing the semiconductor device by writing the initialization information read out from the serial EEPROM to the register interface; (d) generating an initialization completion signal for indicating that the initialization of the semiconductor device is completed, using the DMA; and (e) setting the register interface and the DMA to be prepared for normal operations after the initialization of the semiconductor device is completed.

To achieve the first object according to the second embodiment of the present invention, there is provided a method of initializing a semiconductor device, wherein the semiconductor device stores initialization information and card information structure (CIS) information concerning a cardbus PC card and includes a DMA, a serial EEPROM interface, a register interface, and a memory controller that are connected to a system bus according to the initialization information and the CIS information, the method comprising the acts of: (a) setting an operational channel to allow the DMA automatically initialize the semiconductor device in a state where the semiconductor device is reset; (b) reading the initialization information from the serial EEPROM in response to the operational channel set in the DMA after the reset state of the semiconductor device is cancelled; (c) initializing the semiconductor device by writing the initialization information read out from the serial EEPROM to the register interface; (d) reading the CIS information from the serial EEPROM in response to the operational channel set in the DMA, and writing the CIS information read from the serial EEPROM in an external memory; (e) generating an initialization completion signal for indicating that the initialization of the semiconductor device is completed; and (f) automatically setting the interface and the DMA to be prepared for normal operations after the initialization of the semiconductor device is completed.

To achieve the first object according to the third embodiment of the present invention, there is provided a method of initializing a semiconductor device, wherein the semiconductor device is mounted on a cardbus PC card, stores initialization information and CIS information concerning the cardbus PC card in a serial EEPROM mounted on the cardbus PC card, and includes a DMA, a serial EEPROM interface, a register interface, and a memory controller that are connected to a system bus according to the initialization information and the CIS information, the method comprising: (a) setting an operational channel to allow the DMA automatically initialize the semiconductor device in a state where the semiconductor device is reset; (b) reading the initialization information from the serial EEPROM in response to the operational channel set in the DMA after the reset state of the semiconductor device is cancelled; (c) initializing the semiconductor device by writing the initialization information read out from the serial EEPROM to the register interface; (d) reading the CIS information from the serial EEPROM following the operational channel set in the DMA and writing the CIS information read out from the serial EEPROM in a memory mounted on the cardbus PC card; (e) generating an initialization completion signal for indicating that the initialization of the semiconductor device is completed, and (f) automatically setting the interface and the DMA to be prepared for normal operations after the initialization of the semiconductor device is completed.

To achieve the first object according to the fourth embodiment of the present invention, there is provided a method of initializing a semiconductor device, wherein the semiconductor device is mounted on a PCI card, stores initialization information and other information in a serial EEPROM mounted on the PCI card, and includes a DMA, a serial EEPROM interface, a register interface, and a memory controller that are connected to a system bus according to the initialization information and the other information, the method comprising the acts of: (a) setting an operational channel to allow the DMA automatically initialize the semiconductor device in a state where the semiconductor device is reset; (b) reading the initialization information from the serial EEPROM in response to the operational channel set in the DMA after the reset state of the semiconductor device is cancelled; (c) initializing the semiconductor device by writing the initialization information read out from the serial EEPROM to the register interface; (d) reading the other information from the serial EEPROM following the operational channel set in the DMA and writing the other information read from the serial EEPROM to a memory mounted on the PCI card; (e) generating an initialization completion signal for indicating that the initialization of the semiconductor device is completed, using the DMA; and (f) automatically setting the interface and the DMA to be prepared for normal operations after the initialization of the semiconductor device is completed.

To achieve the second object according to the first embodiment of the present invention, there is provided a semiconductor device comprising: a central processing unit (CPU) which is turned off in response to an initialization control signal and is turned on in response to an initialization completion signal; a direct memory access (DMA); a reset controller which allows the DMA to perform an initialization operation in response to a reset signal, generates the initialization control signal used to turn off the CPU, and is reset in response to the initialization completion signal; a serial EEPROM interface which is controlled by the DMA and interfaces with an external serial EEPROM to read initialization information from the serial EEPROM; and an interface which is controlled by the DMA, receives the initialization information from the serial EEPROM interface, and stores the initialization information in a register, wherein the DMA performs an initialization operation using the initialization information in response to the initialization control signal in a state where the semiconductor device is reset and generates the initialization completion signal for performing a normal operation after the reset state of the semiconductor device is cancelled.

To achieve the second object according to the second embodiment of the present invention, there is provided a semiconductor device comprising: a central processing unit (CPU) which is turned off in response to an initialization control signal and is turned on in response to an initialization completion signal; a direct memory access (DMA); a reset controller which allows the DMA to perform an initialization operation in response to a reset signal, generates the initialization control signal used to turn off the CPU, and is reset in response to the initialization completion signal; a serial EEPROM interface which is controlled by the DMA and interfaces with an external serial EEPROM to read initialization information and other information from the serial EEPROM; an interface which is controlled by the DMA, receives the initialization information from the serial EEPROM interface, and stores the initialization information in a register, and a memory controller which is controlled by the DMA, reads the information other than the initialization information from the serial EEPROM, and stores the information other than the initialization information in an external memory, wherein the DMA performs an initialization operation using the initialization information and the other information in response to the initialization control signal in a state where the semiconductor device is reset and generates the initialization completion signal for performing a normal operation after the reset state of the semiconductor device is cancelled.

As described above, the semiconductor device for initializing an interface card according to the present invention and the initializing method therefore, unlike the prior art, in which a semiconductor device initializes an interface card by storing initialization information in a ROM, do not use a ROM. Thus, it is possible to reduce the manufacturing cost, and it is easy to obtain bug patches and upgrade the semiconductor device by downloading a program for operating an interface card.

In the present invention, unlike in the prior art, there is no need to install a dedicated serial EEPROM interface in the register interface, and thus a direct memory access (DMA) and the register interface require a smaller circuit area than that of the prior art during an initialization operation. In addition, only one serial EEPROM interface is required for a semiconductor device, and thus it is possible to reduce the area of a circuit and decrease the number of pins used to install a serial EEPROM interface in a semiconductor device.

Finally, since it is possible to store initialization information, card information structure (CIS information), and other information in a serial EEPROM and read the information stored in the serial EEPROM using a CPU, it is possible to use the serial EEPROM more effectively.

BRIEF DESCRIPTION OF THE DRAWINGS

The above objects and advantages of the present invention will become more apparent by describing in detail the preferred embodiments thereof with reference to the attached drawings in which.

DETAILED DESCRIPTION OF PREFERRED EMBODIMENTS

The present invention will now be described more fully with reference to the accompanying drawings, in which the preferred embodiments of the invention are shown. The same reference numerals in different drawings represent the same elements.

Figure 4:
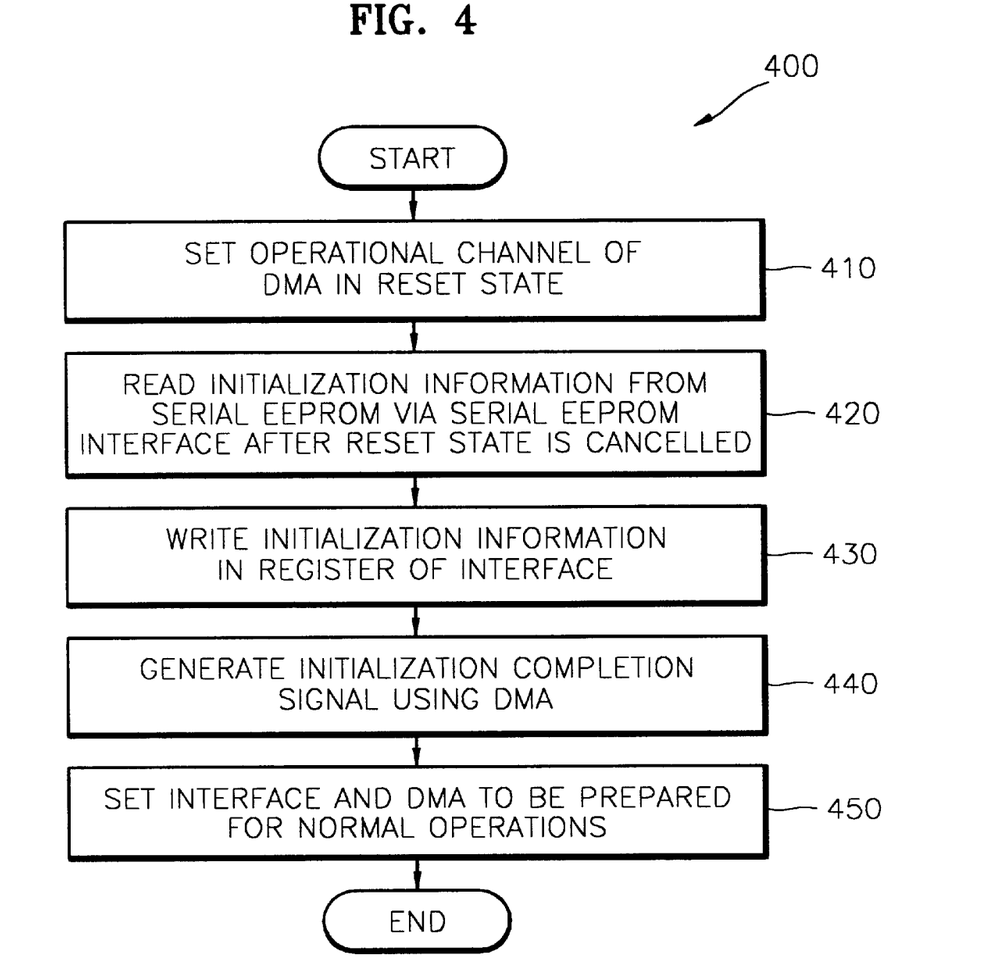
FIG. 4 is a flow chart illustrating a method of initializing a semiconductor device according to a first embodiment of the present invention.

FIG. 4 is a flow chart illustrating a method of initializing a semiconductor device according to a first embodiment of the present invention. Referring to FIG. 4, a method 400 of initializing a semiconductor device, which stores initialization information in a serial electrically erasable and programmable read only memory (EEPROM) and includes a direct memory access (DMA) system, a serial EEPROM interface, and an interface that are connected to a bus system according to the initialization information, includes setting an operational channel using the DMA in a state where the semiconductor device is reset in order to automatically initialize the semiconductor device (step 410), reading the initialization information from the serial EEPROM following the operational channel set in the DMA after the reset mode of the semiconductor device is cancelled (step 420), initializing the semiconductor device by recording the initialization information read out from the serial EEPROM in a predetermined register of the interface (step 430), generating an initialization completion signal for indicating that the initialization of the semiconductor device is completed using the DMA (step 440), and automatically setting the interface and the DMA to be prepared for normal operation after the initialization of the semiconductor device is completed (step 450).

Figure 5:
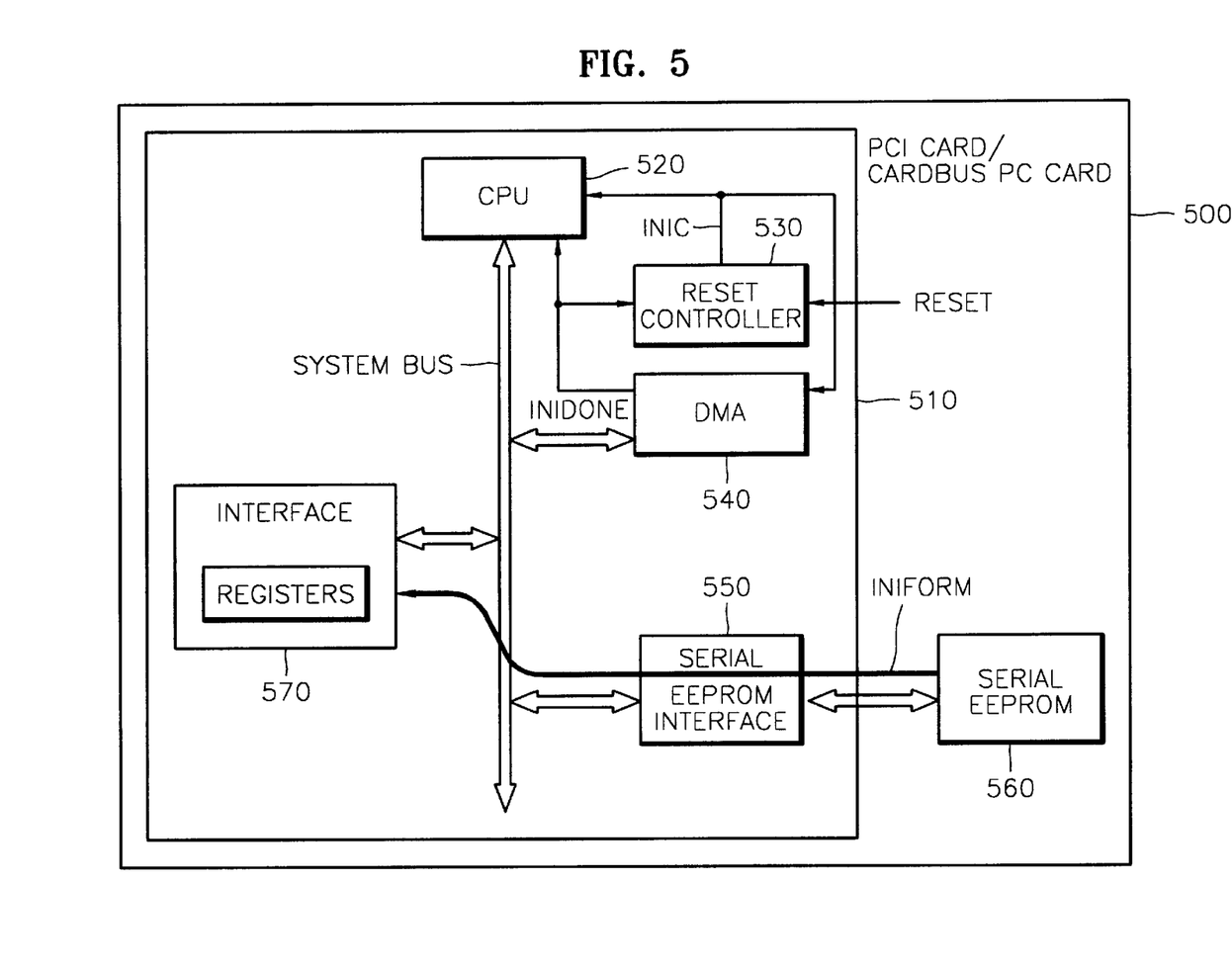
FIG. 5 is a block diagram of a semiconductor device according to a first embodiment of the present invention.

FIG. 5 is a block diagram of a semiconductor device according to a first embodiment of the present invention. Referring to FIG. 5, a semiconductor device 510 according to the first embodiment of the present invention includes a central process unit (CPU) 520, a DMA 540, a reset controller 530, a serial EEPROM interface (550), and a register interface 570.

The CPU 520 is turned off in response to a predetermined initialization control signal INIC and is turned on in response to an initialization completion signal INIDONE. The reset controller 530 allows the DMA 540 to perform an initialization operation in response to a reset signal RESET, generates the initialization control signal INIC used to turn off the CPU 520, and is reset in response to the initialization completion signal INIDONE.

The serial EEPROM interface 550 is controlled by the DMA 540 and provides an interface for receiving the predetermined initialization information INIFORM stored in the serial EEPROM 560. The register interface 570 is controlled by the DMA 540, receives the initialization information INIFORM from the serial EEPROM interface 550, and stores the initialization information INIFORM in a register. The DMA 540 performs an initialization operation using the initialization information INIFORM in response to the initialization control signal INIC in a reset mode and generates the initialization completion signal INIDONE to perform a normal operation.

Hereinafter, the method of initializing a semiconductor device according to the present invention and the semiconductor device for initialization according to the present invention will be described more fully with reference to FIGS. 4 and 5.

The semiconductor device 510 of a PCI card 500 or a cardbus PC card 500 includes the DMA 540, which serves as a master of a bus system, and the serial EEPROM interface 550, which serves as a bus target. In general, the DMA 540 serves as a data transmitter, which reads data from a peripheral block and writes data to a different peripheral block. Accordingly, if a predetermined list of addresses is generated in the DMA 540, the DMA 540 reads data from the serial EEPROM interface 550 and transmits the data to the register interface 570. In other words, in a reset mode (or in a state where the semiconductor device 510 is reset), the registers of the DMA 540 are set at predetermined initialization values and the DMA 540 is operated by the initialization values when the reset mode is completed.

In the reset mode of the semiconductor device 510, the DMA 540 sets an operational channel used to initialize the semiconductor device 510 in step 410.

The reset controller 530 allows the DMA 540 to perform an initialization operation in response to the reset signal RESET and generates the initialization control signal INIC for turning off the CPU 520. The reset controller 530 is reset by the initialization completion signal INIDONE, which will be described in greater detail below.

In this example, the semiconductor device 510 comprises a system-on-chip (SOC) mounted on the peripheral component interconnect card 500 or the cardbus PC card 500.

The DMA 540 sets an operational channel used to perform an initialization operation in response to the initialization control signal INIC. The operational channel of the DMA 540 includes a source address, at which the initialization information INIFORM used to initialize the interface 570 is stored, a destination address, at which the initialization information INIFORM will be stored, and a transfer counter, at which the size of the initialization information INIFORM will be stored. These addresses are stored in a register of the DMA 540, and the DMA 540 transmits the initialization information INIFORM according to the addresses of the operation channel after the reset mode of the semiconductor device 510 is complete. In other words, the DMA 540 performs an initialization operation using the initialization information INIFORM in response to the initialization control signal INIC in the reset mode of the semiconductor device 510 and generates the initialization completion signal INIDONE to perform a normal operation after the reset mode of the semiconductor device 510 is complete.

After the reset mode of the semiconductor device 510 is complete, the initialization information INIFORM stored in the serial EEPROM 560 is read out by the serial EEPROM interface 550 in response to the operation channel set in the DMA 540 in step 420. Here, the initialization information INIFORM includes certain information, for example the manufacturer and type of card, on which the semiconductor device 510 is to be mounted.

The semiconductor device 510 is initialized by writing the initialization information INIFORM read out from the serial EEPROM 560 in a predetermined register of the interface 570 during step 430. If the initialization of the semiconductor device 510 is completed by repeatedly performing the process of writing the initialization information INIFORM in a register of the interface 570, the DMA 540 generates the initialization completion signal INIDONE for indicating that the initialization of the semiconductor device 510 is completed in step 440.

After the initialization of the semiconductor device 510 is completed, the interface 570 and the DMA 540 are automatically set to be prepared for normal device operation in step 450. In other words, the CPU 520 is activated in response to the initialization completion signal INIDONE generated by the DMA 540 and begins to operate. Then, a host system (not shown) is able to recognize the PCI card 500 or the cardbus PC card 500.

The semiconductor device 510 for initializing an interface card or the method 400 of initializing the semiconductor device 510 described above provide a number of advantages over conventional devices or methods, in which the interface includes a serial EEPROM interface. First, the DMA 540 and the interface 570 do not require a larger area. Since the semiconductor device 510 requires only one serial EEPROM interface 550, it is possible to decrease the area of the semiconductor device 510.

Second, in the prior art, it is difficult to share the pins of the serial EEPROM with other adjacent circuits, and thus the pins are independently allotted to the serial EEPROM. However, in the present invention, it is possible to use the serial EEPROM 560 without requiring additional pins.

Third, in the conventional systems, there is no data path for the CPU 520 to read data from the serial EEPROM 560, and thus it is impossible to use the serial EEPROM 560 for purposes other than the initialization of the semiconductor device 510. However, in the present invention, since the serial EEPROM interface 550 exists independent of the register interface 570, the CPU 520 can read data other than initialization data from the serial EEPROM 560, and thus it is possible to use the serial EEPROM 560 more effectively than in the conventional systems.

Figure 6:
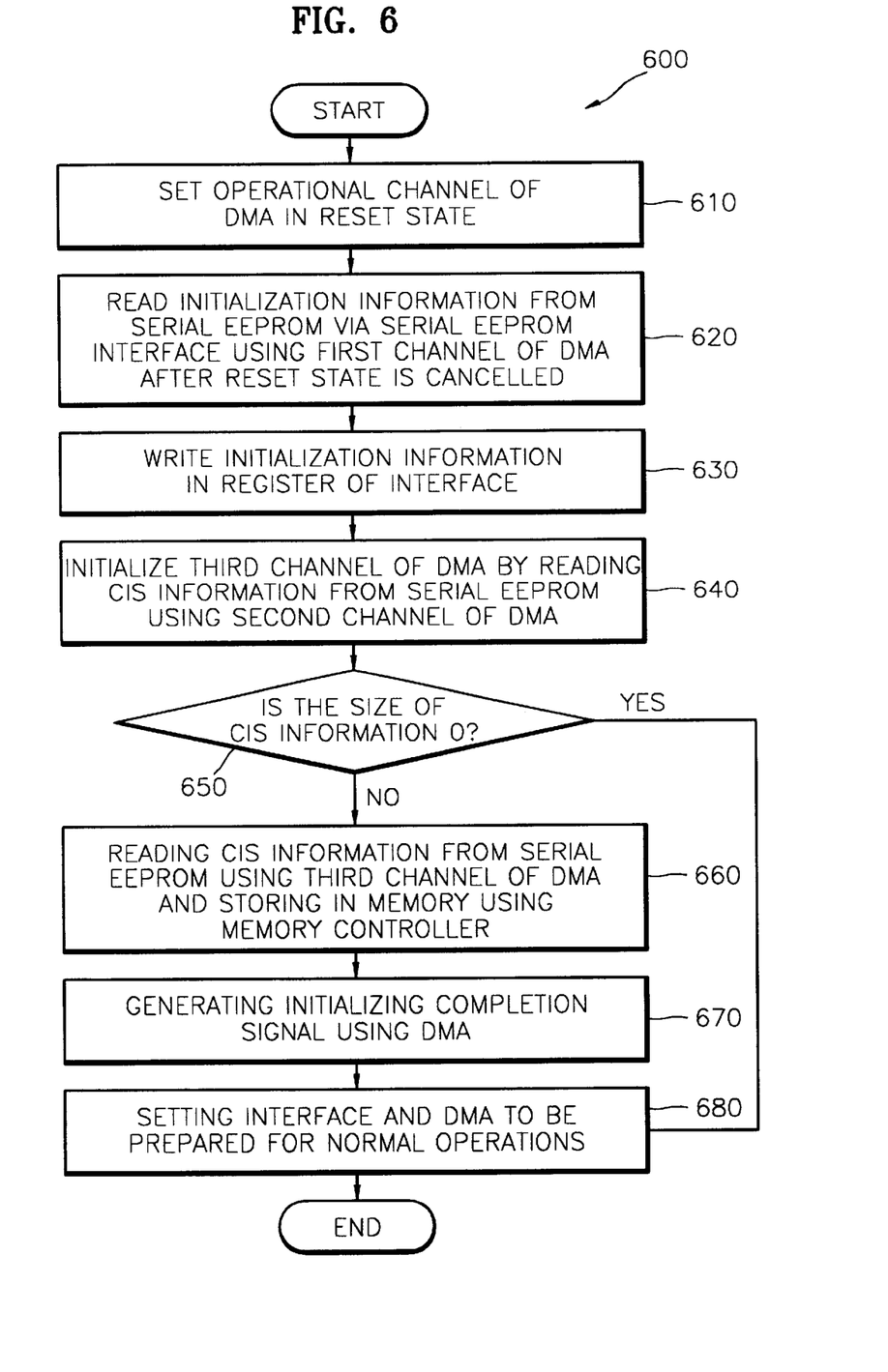
FIG. 6 is a flow chart illustrating a method of initializing a semiconductor device according to a second embodiment of the present invention.

FIG. 6 is a flow chart illustrating a method of initializing a semiconductor device according to a second embodiment of the present invention. Referring to FIG. 6, a method 600 of initializing a semiconductor device, which stores initialization information and card information structure (CIS) information on a cardbus PC card in a serial electrically erasable and programmable read only memory (EEPROM), and includes a direct memory access (DMA), a serial EEPROM interface, an interface, and a memory controller that are connected to a system bus according to the initialization information and the CIS information, includes setting an operational channel using the DMA in a state where the semiconductor device is reset in order to automatically initialize the semiconductor device (step 610), reading the initialization information from the serial EEPROM following the operational channel set in the DMA after the reset mode of the semiconductor device is cancelled (step 620), initializing the semiconductor device by recording the initialization information read out from the serial EEPROM in a predetermined register of the interface (step 630), reading the CIS information from the serial EEPROM following the operational channel set in the DMA and determining whether or not the size of the CIS information is 0 (steps 640 and 650), writing the CIS information read out from the serial EEPROM in an external memory if the size of the CIS information is not 0 (step 660), generating an initialization completion signal for indicating that the initialization of the semiconductor device is completed using the DMA if the size of the CIS information is 0 (step 670), and automatically setting the interface and the DMA to be prepared for normal operations after the initialization of the semiconductor device is completed (step 680).

Figure 7:
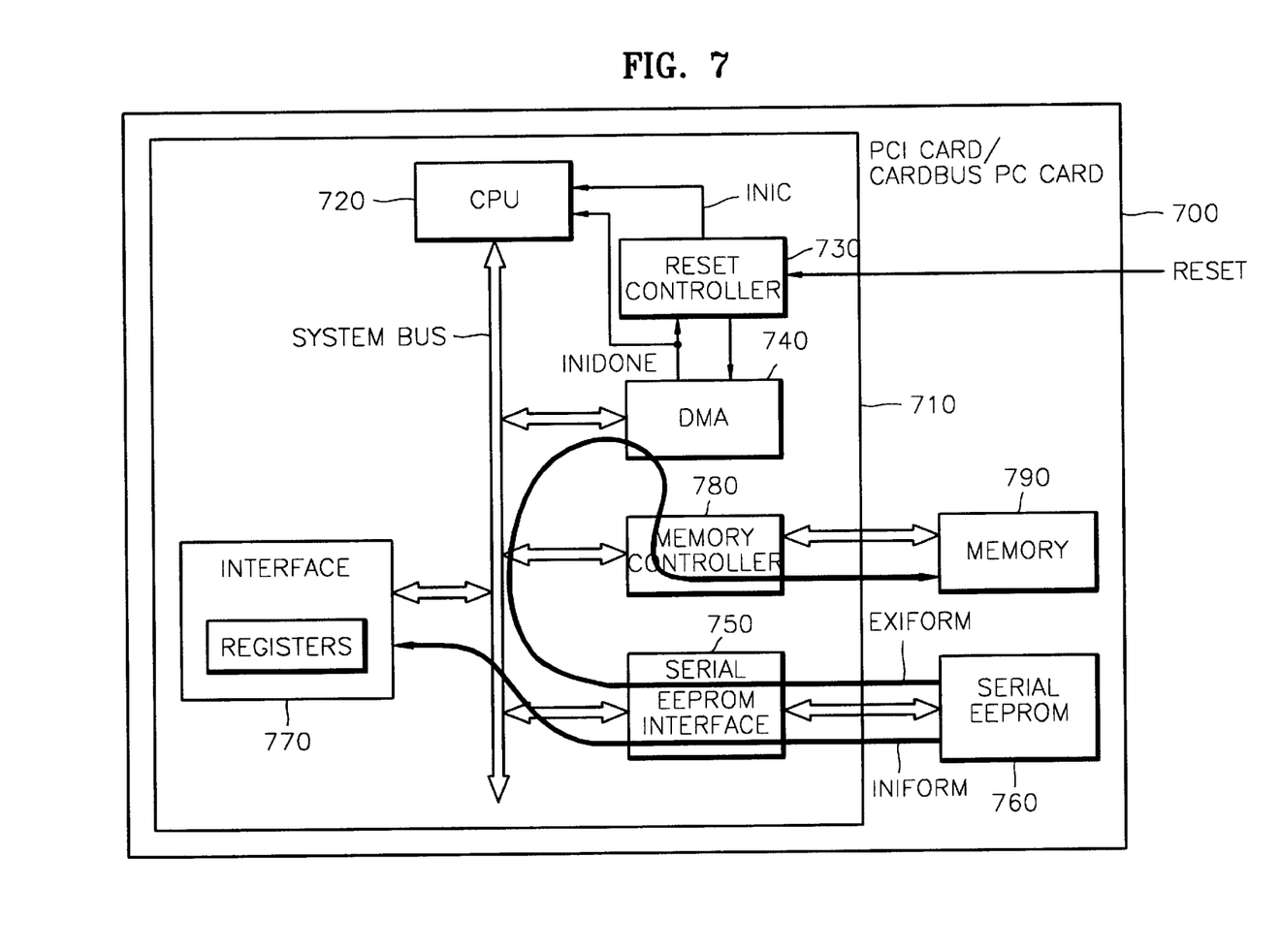
FIG. 7 is a block diagram of a semiconductor device according to a second embodiment of the present invention.

FIG. 7 is a block diagram of a semiconductor device according to a second embodiment of the present invention. Referring to FIG. 7, a semiconductor device 710 according to the second embodiment of the present invention includes a central processing unit (CPU) 730, a direct memory access (DMA) 740, a reset controller 730, a serial EEPROM interface 750, a register interface 770, and a memory controller 780.

The CPU 720 is turned off in response to a predetermined initialization control signal INIC and is turned on in response to a predetermined initialization completion signal INIDONE. The reset controller 730 allows the DMA 740 to perform an initialization operation in response to a reset signal RESET, generates the initialization control signal INIC used to turn off the CPU 720, and is reset in response to the initialization completion signal INIDONE.

The serial EEPROM interface 750 is controlled by the DMA 740 and interfaces with the serial EEPROM 760 to read predetermined initialization information INIFORM and other information EXIFORM. The register interface 770 is controlled by the DMA 740, receives the initialization information INIFORM from the serial EEPROM interface 750, and stores the initialization information INIFORM in an inner register. The memory controller 780 is controlled by the DMA 740, reads the other information EXIFORM from the serial EEPROM 750, and stores the other information EXIFORM in an external memory 790. The DMA 740 performs an initialization operation using the initialization information INIFORM and the other information EXIFORM in response to the initialization control signal INIC in the reset state of the semiconductor device 710 and generates the initialization completion signal INIDONE in order to initiate normal operation after the reset state of the semiconductor device 710 is cancelled.

Hereinafter, the method 600 of initializing a semiconductor device according to the second embodiment of the present invention and the semiconductor device 710 according to the second embodiment of the present invention will be described more fully with reference to FIGS. 6 and 7. The method 600 of initializing a semiconductor device shown in FIG. 6 is substantially similar to the method 400 of initializing a semiconductor device shown in FIG. 4, and thus only the differences between the two methods 600 and 400 will be described below. In other words, descriptions of steps 610 and 630 of initializing the semiconductor device 710 will not be repeated here. The initialization of the semiconductor device 710 is performed through a first channel of a plurality of channels of the DMA 740.

The method 600 of initializing a semiconductor device, shown in FIG. 6, may be applied to both a PCI card and a cardbus PC card.

The semiconductor device 710 may be mounted on a PCI card 700 or a cardbus PC card 700 and is a system-on-a-chip, which can be set to be used for either the PCI card 700 or the cardbus PC card 700 by external input pins.

Since a host system accesses the serial EEPROM 760 at a relatively low speed, CIS information can be stored in memory 790 outside the semiconductor device 710. Then, the host system can access the memory 790 at a high speed to read the CIS information stored in the memory 790. In general, in the DMA system 740, a plurality of channels exist, and thus it is possible to allow a channel to be exclusively used for the initialization of the semiconductor device 710 and another channel to be used to move the CIS information to the memory 790. Here, the memory 790 is a nonvolatile memory, such as an SRAM. In addition, it is not determined yet which part of the memory 790 the CIS information will be stored in. Since the size of the CIS information may be different according to the type of cardbus PC card and thus it is impossible to set the size of the CIS information at a predetermined value, a method of initializing a channel of the DMA 740 with the use of another channel of the DMA 740 may be used.

Specifically, the DMA 740 includes a plurality of operational channels used to perform an initialization operation. Among the plurality of operational channels, a first channel includes a source address, at which the initialization information INIFORM used to initialize the interface 770 is stored, a destination address, at which the initialization information INIFORM will be newly written, and a transfer counter, at which the size of the initialization information INIFORM is stored.

A second channel includes a source address, at which CIS information is stored, a destination address, which is used to initialize the destination address value of a predetermined third channel, and a transfer counter, which is used to initialize the transfer counter value of the third channel.

The third channel includes a source address, where CIS information is stored, a destination address, at which the CIS information will be newly written, and a transfer counter, at which the size of the CIS information is stored.

All the addresses of the first through third channels except the destination address and transfer counter of the third channel are operated as reset values of the DMA 740. The three channels each read data from the serial EEPROM 760, and accordingly, the source address of each of the three channels corresponds to the serial EEPROM interface 750.

The destination address of the first channel is the address of a predetermined register of the interface 770, and the destination address of the second channel is the address of a predetermined register of the third channel of the DMA 740. The transfer counters of the first and second channels can be set in advance based on the initialization information INIFORM and the sizes of the destination address and transfer counter of the third channel.

The operation of the DMA 740 will now be described. The third channel is initialized by reading the destination address, at which the CIS information will be stored, and the transfer counter, at which the size of the CIS information is stored, from the serial EEPROM 760 using the second channel of the DMA 740 in step 640. Next, the DMA 740 determines whether or not the size of the CIS information is 0 in step 650. If the size of the CIS information is not 0, the CIS information is read from the serial EEPROM 760 through the serial EEPROM interface 750 using the third channel of the DMA 740 and is stored in the memory 790 using the memory controller 780 in step 660. In other words, the memory controller 780 reads the CIS information from the serial EEPROM interface under control of the DMA 740 and stores the CIS information in the memory 790, in which case the semiconductor device 710 is set to be mounted on the cardbus PC card 700 by controlling external pins.

If the size of the CIS information is 0, the DMA 740 generates the initialization completion signal INIDONE for indicating that the initialization of the semiconductor device 710 is completed. Alternatively, the DMA 740 generates the initialization completion signal INIDONE when the CIS information is completely stored in the memory 790 in step 670.

After the initialization of the semiconductor device 710 is completed, the interface 770 and the DMA 740 are automatically set to be prepared for normal operation in step 680. In other words, the CPU 720 is turned on in response to the initialization completion signal INIDONE generated by the DMA 740 and begins to operate so that the host system (not shown) can recognize the PCI card 700 or the cardbus PC card 700.

In the method 600 of initializing a semiconductor device shown in FIG. 6, the card, on which the semiconductor device 710 is mounted, corresponds to a PCI card in a case where the size of the CIS information is 0. Alternatively, the card, on which the semiconductor device 710 is mounted, may correspond to a cardbus PC card in a case where the size of the CIS information is not 0. Accordingly, in a case where the card, on which the semiconductor device 710 is mounted, is a PCI card, steps 640 through 660 can be omitted.

In a case where the semiconductor device 710 shown in FIG. 7 is mounted on a PCI card, the semiconductor device 710 can be initialized using the method 600 of initializing a semiconductor device shown in FIG. 6 without omitting steps 640 through 660 by storing the information EXIFORM other than the initialization information INIFORM in the serial EEPROM 760 instead of storing the CIS information in the serial EEPROM 760.

Figure 8:
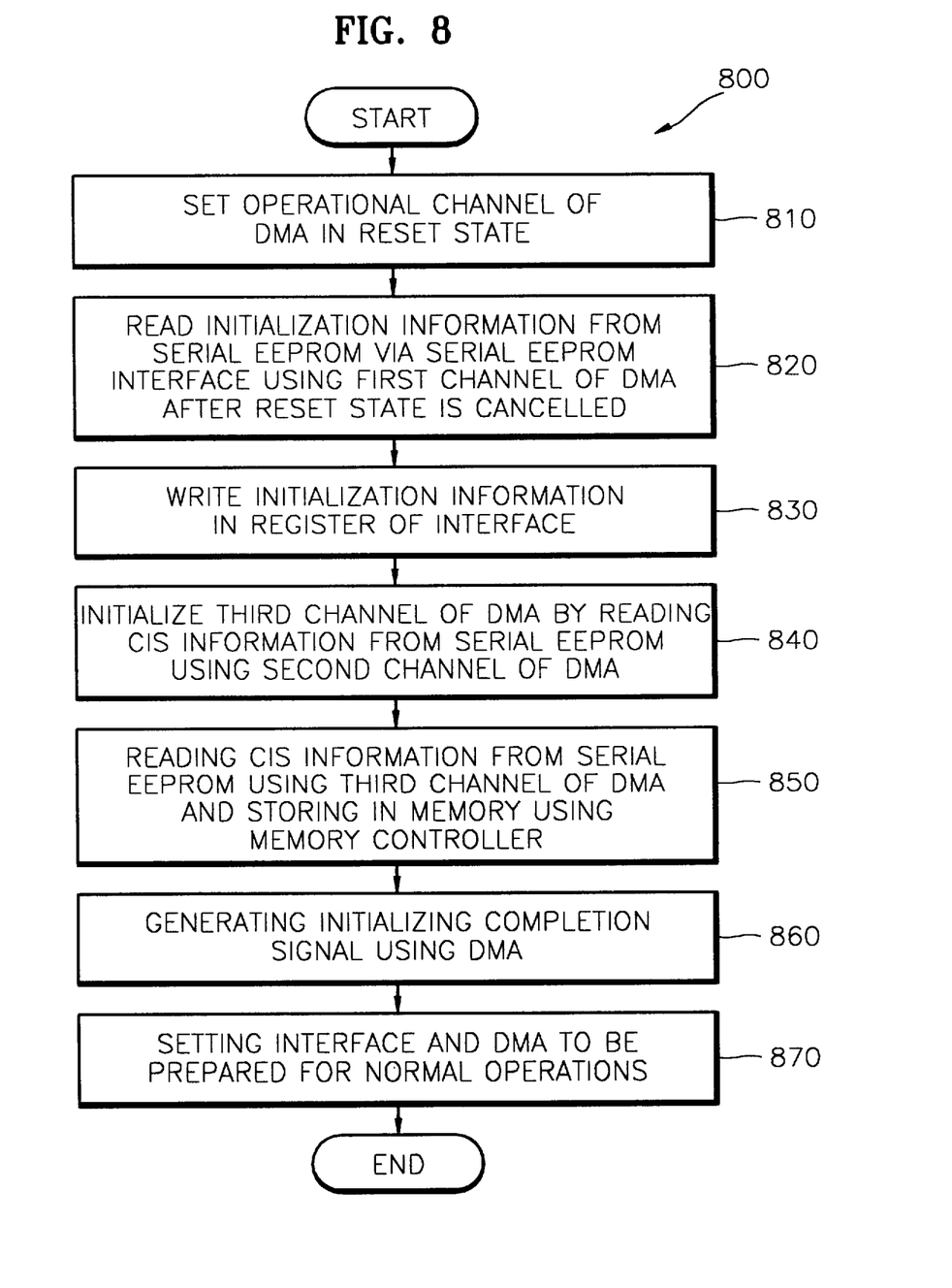
FIG. 8 is a flow chart illustrating a method of initializing a semiconductor device according to a third embodiment of the present invention.

FIG. 8 is a flow chart illustrating a method of initializing a semiconductor device according to a third embodiment of the present invention. Referring to FIG. 8, a method 800 of initializing a semiconductor device, which is mounted on a cardbus PC card, stores predetermined initialization information and CIS information on the cardbus PC card in a serial EEPROM mounted on the cardbus PC card, and includes a DMA, a serial EEPROM interface, a register interface, and a memory controller that are connected to a system bus according to the initialization information and the CIS information, includes setting an operational channel for automatically initializing the semiconductor device using the DMA in a state where the semiconductor device is reset (step 810). The method 800 of initializing a semiconductor device is the same as the method 600 of initializing a semiconductor device except that the method 800 of initializing a semiconductor device can be applied only to a semiconductor mounted on a cardbus PC card. Accordingly, the method 800 of initializing a semiconductor device does not include a step of determining whether or not CIS information exists, which corresponds to step 650 of the method 600 of initializing a semiconductor device.

After the reset state of the semiconductor device is cancelled, the initialization information stored in the serial EEPROM is read out through the serial EEPROM interface following the operational channel set in the DMA in step 820. In step 820, a first channel among a plurality of operational channels of the DMA is used to read the initialization information from the serial EEPROM. The semiconductor device is initialized by writing the initialization information read from the serial EEPROM in a predetermined register of the interface in step 830. The CIS information is read from the serial EEPROM by following the operation channel set in the DMA in step 840 and is written in a memory mounted on the cardbus PC card in step 850. Specifically, a destination address, at which the CIS information will be stored, and a transfer counter, at which the size of the CIS information is stored, are read from the serial EEPROM using a second channel, thus initializing a third channel in step 840. The CIS information is read from the serial EEPROM through the serial EEPROM interface using the third channel of the DMA and is stored in the memory using the memory controller in step 850. Next, the DMA generates an initialization completion signal for indicating that the initialization of the semiconductor device is completed in step 860. After the initialization of the semiconductor device is completed, the interface and the DMA are automatically set to be prepared for normal operations in step 870.

Figure 9:
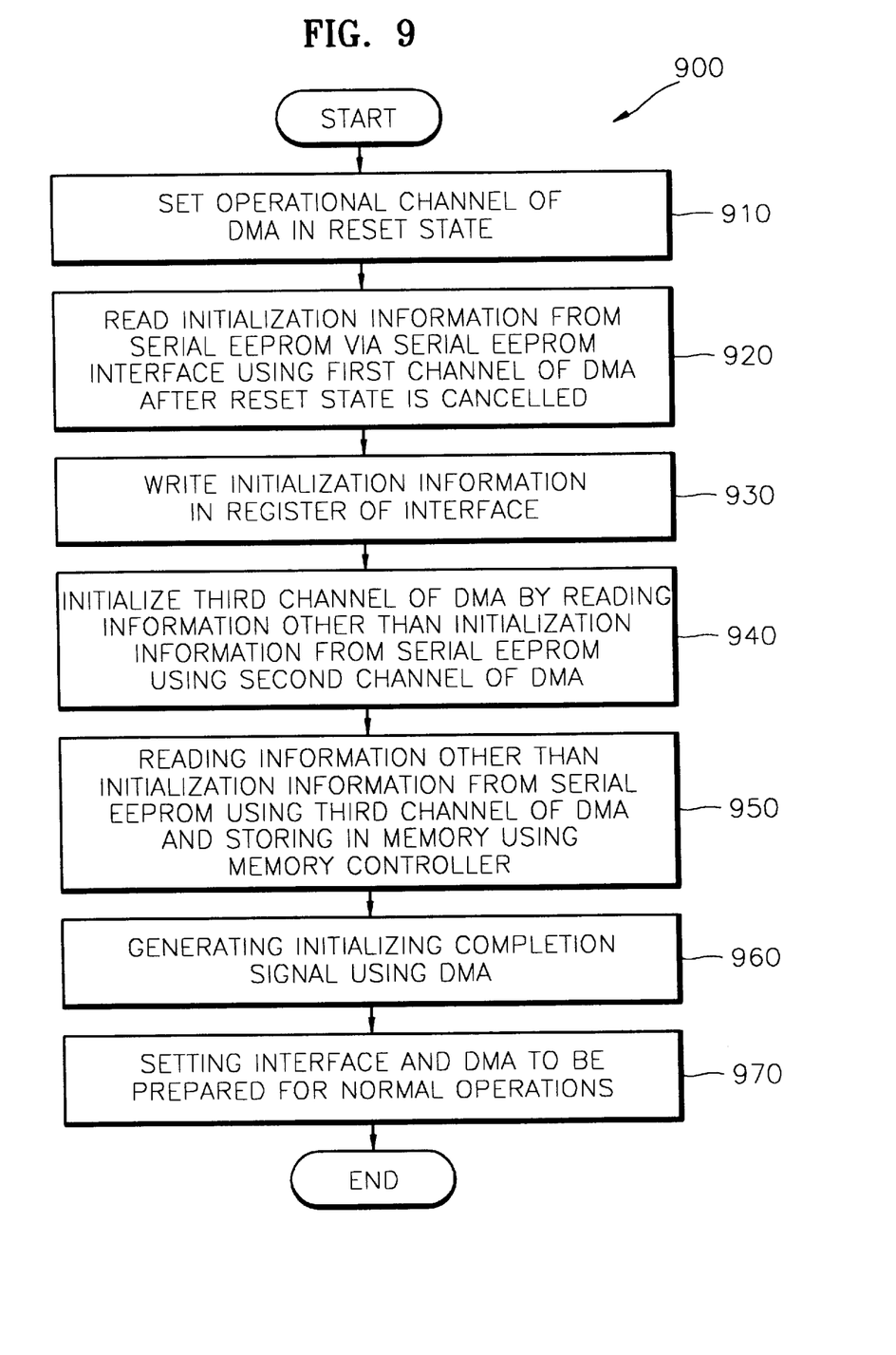
FIG. 9 is a block diagram of a semiconductor device according to a third embodiment of the present invention.

FIG. 9 is a flow chart illustrating a method of initializing a semiconductor device according to a fourth embodiment of the present invention. Referring to FIG. 9, a method 900 of initializing a semiconductor device, which is mounted on a PCI card, stores initialization information and other information in a serial EEPROM mounted on the PCI card, and includes a DMA, a serial EEPROM interface, a register interface, and a memory controller that are connected to a system bus according to the initialization information and the other information, includes setting an operational channel for automatically initializing the semiconductor device using the DMA in step 910.

The method 900 of initializing a semiconductor device is the same as the method 600 of initializing a semiconductor device except that the method 900 of initializing a semiconductor device can be applied only to a semiconductor device mounted on a PCI card. Accordingly, as described above with reference to FIG. 7, the information EXIFORM other than the initialization information INIFORM used to initialize the interface 770 of the semiconductor device 710, instead of CIS information, is stored in the serial EEPROM 760, is read from the serial EEPROM using the second and third channels of the DMA 740, and is stored in the memory 790.

After the reset state of the semiconductor device is cancelled, the initialization information stored in the serial EEPROM is read out through the serial EEPROM interface following the operational channel set in the DMA in step 920. In step 920, a first channel among a plurality of operational channels of the DMA is used to read the initialization information from the serial EEPROM. The semiconductor device is initialized by writing the initialization information read from the serial EEPROM in a register of the interface in step 930. The information other than the initialization information is read from the serial EEPROM following the operational channel set in the DMA and is written in a memory mounted on the PCI card in steps 940 and 950. Specifically, a destination address, at which the information other than the initialization information will be stored, and a transfer address, at which the size of the information other than the initialization information is stored, are read from the serial EEPROM using a second channel of the DMA, thus initializing a third channel in step 940. The information other than the initialization information is read from the serial EEPROM through the serial EEPROM interface following the third channel of the DMA and is stored in the memory using the memory controller in step 950. The DMA generates an initialization completion signal for indicating that the initialization of the semiconductor device is completed in step 960. The interface and the DMA are automatically set to be prepared for normal operations in step 970.

As described above, unlike a conventional semiconductor device which initializes an interface card by storing initialization information in a ROM, the semiconductor device for initializing an interface card according to the present invention and the initializing method therefore do not require a ROM, and thus it is possible to reduce the manufacturing costs. In addition, since it is possible to download programs for operating cards in the present invention, it is easy to download bug patches and to upgrade the semiconductor device.

The present invention, by including a single EEPROM interface under the control of a DMA, does not require a larger area, as opposed to the conventional devices described above. The semiconductor device according to the present invention requires only a single serial EEPROM interface, and thus it is possible to reduce the area of a circuit and the number of pins used for the serial EEPROM.

In addition, in the present invention, it is possible to store not only initialization information but also CIS information and other information in a serial EEPROM and read the information other than the initialization information from the serial EEPROM. Thus, it is possible to use the serial EEPROM more effectively.

While this invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A method of initializing a semiconductor device, wherein the semiconductor device stores initialization information in a serial electrically erasable and programmable read only memory (EEPROM) and includes a direct memory access (DMA), a serial EEPROM interface, and a register interface that are connected to a system bus according to the initialization information, the method comprising:

(a) setting an operational channel to allow the DMA to automatically initialize the semiconductor device while in a reset state;

(b) reading the initialization information from the serial EEPROM in response to the operational channel set in the DMA after the reset state of the semiconductor device is cancelled;

(c) initializing the semiconductor device by writing the initialization information read from the serial EEPROM to the register interface;

(d) generating an initialization completion signal for indicating that the initialization of the semiconductor device is completed; and (e) setting the register interface and the DMA in a state of normal operation following initialization of the semiconductor device.

2. The method of claim 1, wherein the semiconductor device comprises a system-on-a-chip mounted on a peripheral component interconnect (PCI) card or a cardbus PC card.

3. The method of claim 1, wherein the initialization information includes information related to the manufacturer of, and type of, a card on which the semiconductor device is mounted.

4. The method of claim 1, wherein the operational channel of the DMA includes a source address, at which the initialization information is stored, a destination address, at which the initialization information is to be written, and a transfer counter indicating the size of the initialization information is stored.

5. A method of initializing a semiconductor device, wherein the semiconductor device stores initialization information and card information structure (CIS) information concerning a cardbus PC card and includes a DMA, a serial EEPROM interface, a register interface, and a memory controller that are connected to a system bus according to the initialization information and the CIS information, the method comprising:

(a) setting an operational channel to allow the DMA to automatically initialize the semiconductor device while in a reset state;

(b) reading the initialization information from the serial EEPROM in response to the operational channel set in the DMA after the reset state of the semiconductor device is cancelled;

(c) initializing the semiconductor device by writing the initialization information read from the serial EEPROM to the register interface;

(d) reading the CIS information from the serial EEPROM in response to the operational channel set in the DMA, and writing the CIS information read from the serial EEPROM to an external memory;

(e) generating an initialization completion signal for indicating that the initialization of the semiconductor device is completed; and (f) setting the register interface and the DMA in a state of normal operation following initialization of the semiconductor device.

6. The method of claim 5, wherein the DMA comprises a plurality of operational channels for automatically initializing the semiconductor device, comprising: :a first operational channel including a source address, at which the initialization information is stored, a destination address, at which the initialization information is to be written, and a transfer counter; a second operational channel including a source address, at which the CIS information is stored, and a destination address and a transfer counter used to initialize the values of a destination address and a transfer counter of a third operational channel; and a third operational channel including a source address, at which the CIS information is stored, a destination address, at which the CIS information is to be written, and a transfer counter.

7. The method of claim 6, wherein the step (d) comprises:
  (d1) initializing the third channel by reading a destination address, at which the CIS information is to be stored, and a transfer counter containing the amount of CIS information to be stored, from the serial EEPROM using the second channel of the DMA;
  (d2) determining whether or not the size of the CIS information is 0, using the DMA and performing the step (e) if the size of the CIS information is 0; and
  (d3) reading the CIS information from the serial EEPROM through the serial EEPROM interface using the third channel of the DMA and storing the CIS information read from the serial EEPROM in the memory, if the size of the CIS information is not 0.

8. The method of claim 5, wherein the initialization information includes information related to the manufacturer and type of a card on which the semiconductor device is mounted.

9. The method of claim 5, wherein the semiconductor device comprises a system-on-a-chip, which can be set to be used for either a PCI card or a cardbus PC card by external input pins.

10. The method of claim 5, wherein the memory comprises a nonvolatile memory.

11. A method of initializing a semiconductor device, wherein the semiconductor device is mounted on a cardbus PC card, stores initialization information and CIS information concerning the cardbus PC card in a serial EEPROM mounted on the cardbus PC card, and includes a DMA, a serial EEPROM interface, a register interface, and a memory controller that are connected to a system bus according to the initialization information and the CIS information, the method comprising:
  (a) setting an operational channel to allow the DMA to automatically initialize the semiconductor device while in a reset state;
  (b) reading the initialization information from the serial EEPROM in response to the operational channel set in the DMA after the reset state of the semiconductor device is cancelled;
  (c) initializing the semiconductor device by writing the initialization information read from the serial EEPROM to the register interface;
  (d) reading the CIS information from the serial EEPROM in response to the operational channel set in the DMA and writing the CIS information read from the serial EEPROM to a memory mounted on the cardbus PC card;
  (e) generating an initialization completion signal for indicating that the initialization of the semiconductor device is completed; and
  (f) setting the register interface and the DMA to be prepared in a state of normal operation following initialization of the semiconductor device.

12. The method of claim 11, wherein the DMA comprises a plurality of operational channels for automatically initializing the semiconductor device, comprising: :a first operational channel including a source address, at which the initialization information is stored, a destination address, at which the initialization information is to be written, and a transfer counter; a second operational channel including a source address, at which the CIS information is stored, and a destination address and a transfer counter used to initialize the values of a destination address and a transfer counter of a third operational channel; and a third operational channel including a source address, at which the CIS information is stored, a destination address, at which the CIS information is to be written, and a transfer counter.

13. The method of claim 12, wherein the step (d) comprises:
  (d1) initializing the third channel by reading a destination address, at which the CIS information is to be stored, and a transfer counter, at which the size of the CIS information is stored, from the serial EEPROM using the second channel of the DMA; and
  (d2) reading the CIS information from the serial EEPROM through the serial EEPROM interface using the third channel of the DMA and storing the CIS information read from the serial EEPROM in the memory.

14. The method of claim 11, wherein the initialization information includes information related to the manufacturer and type of card on which the semiconductor device is mounted.

15. The method of claim 11, wherein the memory comprises a nonvolatile memory.

16. A method of initializing a semiconductor device, wherein the semiconductor device is mounted on a PCI card, stores initialization information and other information in a serial EEPROM mounted on the PCI card, and includes a DMA, a serial EEPROM interface, a register interface, and a memory controller that are connected to a system bus according to the initialization information and the other information, the method comprising the acts of:
  (a) setting an operational channel to allow the DMA to automatically initialize the semiconductor device while in a reset state;
  (b) reading the initialization information from the serial EEPROM in response to the operational channel set in the DMA after the reset state of the semiconductor device is cancelled;
  (c) initializing the semiconductor device by writing the initialization information read from the serial EEPROM to the register interface;
  (d) reading the other information from the serial EEPROM in response to the operational channel set in the DMA and writing the other information read from the serial EEPROM to a memory mounted on the PCI card;
  (e) generating an initialization completion signal for indicating that the initialization of the semiconductor device is completed, using the DMA; and
  (f) setting the register interface and the DMA in a state of normal operation following the initialization of the semiconductor device.

17. The method of claim 16, wherein the DMA comprises a plurality of operational channels for automatically initializing the semiconductor device, comprising: a first operational channel including a source address, at which the initialization information is stored, a destination address, at which the initialization information is to be written, and a transfer counter; a second operational channel including a source address, at which the other information is stored, and a destination address and a transfer counter used to initialize the values of a destination address and a transfer counter of a third operational channel; and a third operational channel including a source address, at which the other information is stored, a destination address, at which the other information is to be written, and a transfer counter.

18. The method of claim 17, wherein step (d) comprises:

(d1) initializing the third channel by reading a destination address, at which the other information is to be stored, and a transfer counter, at which the size of the other information is stored, from the serial EEPROM using the second channel of the DMA; and (d2) reading the other information from the serial EEPROM through the serial EEPROM interface using the third channel of the DMA and storing the other information read from the serial EEPROM in the memory.

19. The method of claim 16, wherein the initialization information includes information related to the manufacturer and type of a card, on which the semiconductor device is mounted.

20. The method of claim 16, wherein the memory comprises a nonvolatile memory.

21. A semiconductor device comprising:

a central processing unit (CPU) which is deactivated in response to an initialization control signal and is activated in response to an initialization completion signal;

a direct memory access (DMA);

a reset controller which allows the DMA to perform an initialization operation in response to a reset signal, generates the initialization control signal used to deactivate the CPU, and is reset in response to the initialization completion signal;

a serial EEPROM interface which is controlled by the DMA and interfaces with an external serial EEPROM to read initialization information from the serial EEPROM; and a register interface which is controlled by the DMA, receives the initialization information from the serial EEPROM interface, and stores the initialization information in a register, wherein the DMA performs an initialization operation using the initialization information in response to the initialization control signal while in a reset state and generates the initialization completion signal for performing a normal operation after the reset state of the semiconductor device is cancelled.

22. The semiconductor device of claim 21, wherein the semiconductor device is a system-on-a-chip mounted on a PCI card or a cardbus PC card.

23. The semiconductor device of claim 21, wherein the initialization information includes information related to the manufacturer and type of a card, on which the semiconductor device is mounted.

24. The semiconductor device of claim 21, wherein the DMA includes a source address, at which the initialization information is stored, a destination address, at which the initialization information is to be written, and a transfer counter.

25. A semiconductor device comprising:

a central processing unit (CPU) which is deactivated in response to an initialization control signal and is activated in response to an initialization completion signal;

a direct memory access (DMA);

a reset controller which allows the DMA to perform an initialization operation in response to a reset signal, generates the initialization control signal used to deactivate the CPU, and is reset in response to the initialization completion signal;

a serial EEPROM interface which is controlled by the DMA and interfaces with an external serial EEPROM to read initialization information and other information from the serial EEPROM;

a register interface which is controlled by the DMA, and receives the initialization information from the serial EEPROM interface, and stores the initialization information in a register, and a memory controller which is controlled by the DMA, reads the other information from the serial EEPROM, and stores the other information in an external memory, wherein the DMA performs an initialization operation using the initialization information and the other information in response to the initialization control signal in a reset state and generates the initialization completion signal for performing a normal operation after the reset state of the semiconductor device is cancelled.

26. The semiconductor device of claim 25, wherein the semiconductor device comprises a system-on-a-chip which can be set to be used for either a PCI card or a cardbus PC card by using external input pins.

27. The semiconductor device of claim 25, wherein the initialization information includes information related to the manufacturer and type of a card, on which the semiconductor device is mounted.

28. The semiconductor device of claim 25, wherein the DMA comprises a plurality of operational channels for automatically initializing the semiconductor device, comprising: a first operational channel including a source address, at which the initialization information is stored, a destination address, at which the initialization information is to be written, and a transfer counter; a second operational channel including a source address, at which the other information is stored, and a destination address and a transfer counter used to initialize the values of a destination address and a transfer counter of a third operational channel; and a third operational channel including a source address, at which the other information is stored, a destination address, at which the other information is to be written, and a transfer counter.

29. The semiconductor device of claim 28, wherein the DMA initializes the third channel by reading a destination address, at which the other information is to be stored, and a transfer counter, at which the amount of the other information is stored, from the serial EEPROM using the second channel, reads the other information from the serial EEPROM through the serial EEPROM interface using the third channel, and stores the other information read from the serial EEPROM in the memory using the memory controller.

30. The semiconductor device of claim 25, wherein if the semiconductor device is mounted on a cardbus PC card, the other information corresponds to card information structure (CIS) information on the cardbus PC card.

31. The semiconductor device of claim 25, wherein the memory comprises a nonvolatile memory.

* * * * *